United States Patent
Stroemberg

[11] Patent Number: 6,067,194
[45] Date of Patent: May 23, 2000

[54] IMAGE STABILIZING INSTRUMENT

[75] Inventor: Rolf Stroemberg, Kista, Sweden

[73] Assignee: Leica Camera AG, Solms, Germany

[21] Appl. No.: 08/937,592

[22] Filed: Sep. 29, 1997

[51] Int. Cl.[7] ............................ G02B 27/64; G02B 23/00
[52] U.S. Cl. ........................... 359/557; 359/407; 359/554
[58] Field of Search ..................................... 359/554–557, 359/407–412, 900, 480–482; 396/52–55; 348/208

[56] References Cited

U.S. PATENT DOCUMENTS

| | | | |
|---|---|---|---|
| 2,829,557 | 4/1958 | Jensen | 359/556 |
| 3,475,073 | 10/1969 | Humphrey | 359/556 |
| 3,582,180 | 6/1971 | Gross | 359/555 |
| 4,235,506 | 11/1980 | Saito et al. | 359/556 |
| 4,542,962 | 9/1985 | Stroemberg | 359/556 |
| 5,029,995 | 7/1991 | Weyrauch et al. | 359/554 |
| 5,122,908 | 6/1992 | Sporer | 359/554 |
| 5,237,450 | 8/1993 | Stroemberg | 359/554 |
| 5,521,758 | 5/1996 | Hamano | 359/554 |
| 5,644,413 | 7/1997 | Komma et al. | 359/19 |

FOREIGN PATENT DOCUMENTS

| | | | |
|---|---|---|---|
| 2-284113 | 11/1990 | Japan | 359/412 |
| 503 932 | 9/1996 | Sweden . | |

*Primary Examiner*—Thong Nguyen
*Attorney, Agent, or Firm*—Foley & Lardner

[57] ABSTRACT

An image stabilizing instrument, for example for a binocular, in which synchronous image stability is achieved by fastening two objectives (2, 2') and two attached first reflecting optical elements (3, 3') to a stabilized frame (22), uni-axially pivoted in a cardanic part (11). Second optical elements (4, 4') in each of two parts of the binocular are fastened to the cardanic part (11), which in turn is uni-axially pivoted in the binocular housing (9). The front window fastened to the housing is designed as a color-correcting lens (106) to correct for color aberration.

10 Claims, 5 Drawing Sheets

IMAGE STABILIZING INSTRUMENT

BACKGROUND OF THE INVENTION

An image stabilizing instrument exhibits a stable image even if its housing is subject to unwanted movements. This is made possible when an internal cardan pivoted, inertially stabilized part is carrying optics that are designed so as to define the line of sight of the instrument. This concept is common to essentially all efficient image stabilizing instruments. However, the kind of optics subject to cardan suspension varies greatly. Numerous concepts have been proposed, mostly referring to monocular instruments. The potential user, though, has favored binocular instruments and considerable efforts have been exercised to finding such solutions, even if the progress has been limited.

Concepts of monocular image stabilization may be employed in binocular instruments if the optics in the two binocular halves are linked together with bridges between additional pivot axes, as exemplified in U.S. Pat. No. 2,829, 557. This, however, means a considerable mechanical complexity and, to the knowledge of this inventor, no such instrument has ever been produced. For this reason, concepts have been developed where only one cardan pivoted mechanical part is stabilizing the two optical parts of a binocular system. However, this has proved to lead to surprisingly great problems.

In U.S. Pat. No. 4,235,506, an image stabilized binocular is shown where only one part is cardan pivoted. A drawback here is that the objectives are non-stabilized which leads to a small aperture, considerable aberrations during panning or heavy, complicated objectives. Another great disadvantage is that the two image erecting prisms are joined together in a stabilized part, which leads to a double image at horizontal panning. The stereo characteristics are also inferior. In spite of these shortcomings this seems to be the most commonly used concept today, which should illustrate the difficulty of the problem.

U.S. Pat. No. 4,542,962 suggests a binocular without the above drawbacks. Unfortunately there are others instead: The image is tilted when the binocular is moved in the vertical plane, which may be seen as a drawback by the user. Special so-called roof mirrors—two precisely aligned plane mirrors—are employed for the maybe most interesting design (see FIG. 11). Complicated mechanics is required for the variable inter-ocular distance. It is hard to find space in the light path for Barlow lenses without adversely increasing the size of the binocular. The system also exhibits other drawbacks.

No possible variation according to U.S. Pat. No. 4,542, 962 takes care of all these problems. One finds that good characteristics may be achieved in the vertical plane, this, however, excludes good characteristics in the horizontal plane. Likewise other variations may give good characteristics in the horizontal plane but not in the vertical plane.

The magnification in image stabilized binoculars may be substantially increased over the values for the non-stabilized ones thanks to the fact that the unwanted movements of the housing does not give rise to problems. However, naturally the field of sight and the light power decreases when the magnification increases. Therefore the possibility to switch between at least two magnifications would be of great advantage. Common to all embodiments mentioned above is that this hardly may be implemented in an efficient way.

Swedish Patent 503,932, issued Sep. 30, 1996, discusses an image stabilizing instrument having two objectives (2) and two reflecting optical elements (3) attached to a stabilized frame (22), uni-axially pivoted in a cardanic part (11). Second optical elements (4) are fastened to the cardanic part (11), which in turn is uni-axially pivoted in the binocular housing (9). The entire contents of this Swedish Patent is incorporated herein by reference.

This Swedish patent does not take into consideration and correct for color aberration.

SUMMARY OF THE INVENTION

One of the objectives with the present invention is to realize improved binocular instruments.

Another objective is to take into consideration and correct for color aberration.

Another objective is to make switching between magnifications possible.

Still another objective is to increase the image quality.

The invention provides an image stabilizing optical instrument which includes a housing and a cardanic part connected to the housing via a suspension for rotary motion about a first pivot axis. An objective lens system, a first optical element including at least one reflecting surface, and a second optical element, including at least one reflecting surface, are provided along a light path. At least some part of the objective lens system and the first optical element is fastened together constituting a unit that is connected to the cardanic part via suspension for rotary motion about a second pivot axis. The second optical element is fastened to the cardanic part. An objective lens system having an unstabilized part and a stabilized part is provided wherein the unstabilized part has a chosen difference in focal length between two typical wavelengths to at least partly compensate for chromatic aberration caused by refraction in the instrument when a stabilized part of the instrument is decentered.

DETAILED DESCRIPTION OF THE PREFERRED EMBODIMENTS

Figure 1:
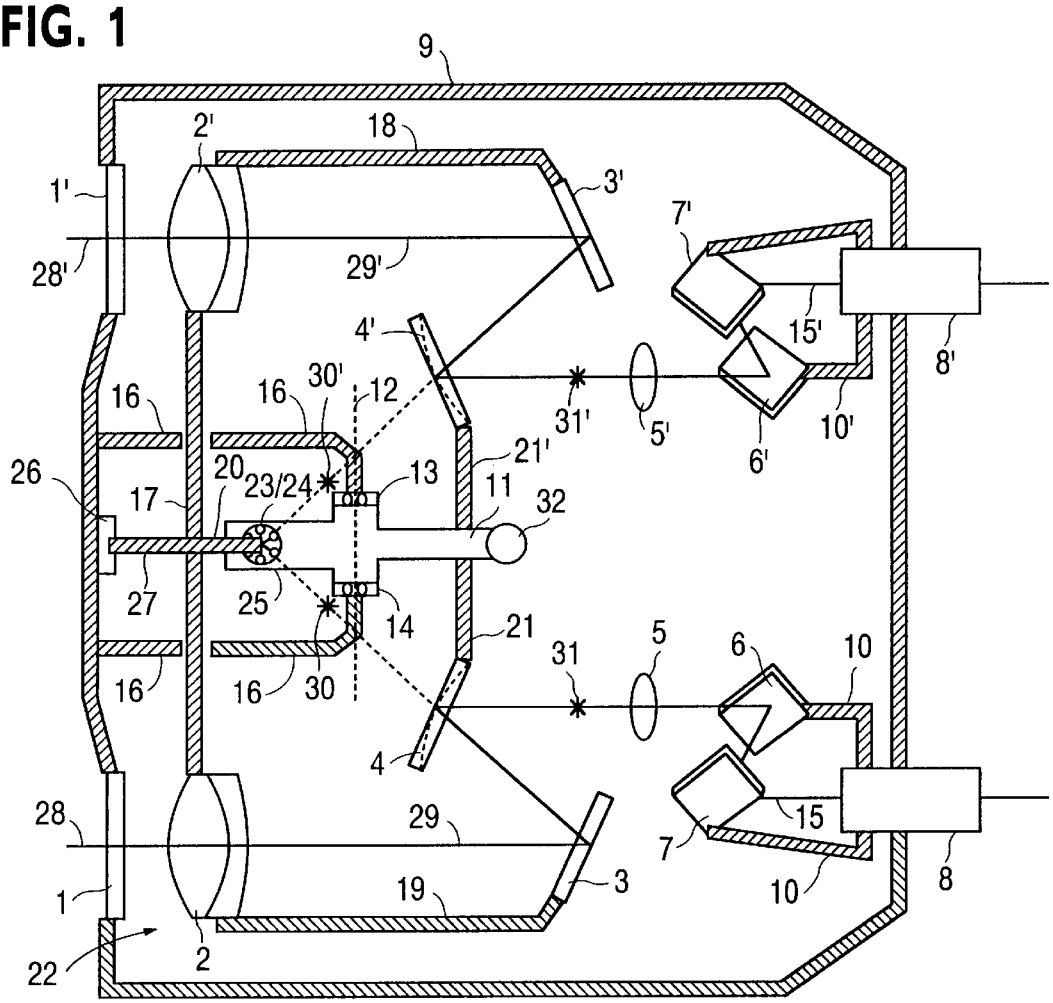
FIG. 1 shows schematically a horizontal cross-section of one preferred embodiment of the binocular according to the invention.

A preferred embodiment of a binocular according to the invention is shown in FIG. 1. This particular embodiment includes the following design criteria.

Central rays are here defined as those light rays 28 and 28' at centered optics that, when entering the instrument, are coaxial with the optical axes 29 and 29' of the corresponding objectives 2, 2'; 37, 37'. The central rays change their directions as they proceed through the instrument and are being reflected in mirror surfaces (FIGS. 1 to 3) or prism surfaces (FIGS. 4 to 8).

The binocular is presumed to be horizontally oriented. The cardan pivoted part of the optics is presumed to be locked to a central position (i.e., "stabilization off"). Optically, the binocular is completely symmetric, the right part does not differ from the left part as indicated by identical reference numerals only differentiated by a stroke. The parts are mirror images of each other. In the following, for reasons of clarity, just the left part is discussed.

Incoming light enters through the window 1, passes the objective 2, is reflected first in the mirror 3, then in the mirror 4, passes the image erecting lens 5 (a positive lens in the FIG. 1 embodiment, is then reflected in the mirrors 6 and 7 before it exits the binocular through the ocular 8, in which an erect image is observed.

The optical effect of the window 1 is neglected, in this embodiment. This window is fastened to the binocular housing 9 and is sealing the binocular to be water and dust tight. The objective 2 is a common achromat.

The mirrors 3 and 4 are parallel to each other at "stabilization off", the mirrors 6 and 7 are always parallel to each other. All mirrors may be front surface coated for high reflectivity but also back surface coated for better protection of the reflecting layer, as shown in FIG. 1. The mirrors 6 and 7 and the ocular are fastened to each other via a frame 10. Variation of the inter-ocular distance is performed by turning the frame 10 around the central ray entering into mirror 6. The same technique for inter-ocular separation is employed for example in U.S. Pat. Nos. 2,829,557 and 3,582,180—FIG. 11, and may therefore be considered to be entirely conventional. The entire contents of these two patents are incorporated herein by reference.

From the housing 9 extends a U-shaped bridge 16, on which the inner parts of two ball bearings 13 and 14 are mounted. The outer parts of the two ball bearings 13 and 14 are fastened to a cardanic part 11. Thus the cardanic part is uni-axially pivoted in the housing 9 along the horizontal pivot axis 12 defined by the ball bearings 13 and 14. The horizontal pivot axis 12 is perpendicular to the optical axes 15 and 15' of the oculars. The mirrors 4 and 4' are fastened to the cardanic part 11 via bridges 21 and 21'. The objectives 2 and 2' as well as the mirrors 3 and 3' are connected via beams 17, 18 and 19, all of which comprise a stabilized unit 22. The stabilized unit 22 is pivoted in the cardanic part 11 via a bridge 20 which is attached to the inner parts of two ball bearings 23 and 24 (the ball bearing 24 is not shown because it is located right below the first ball bearing 23). The ball bearings 23 and 24 define a vertical pivot axis 25. The outer parts of the ball bearings 23 and 24 are fastened to the cardanic part 11. From the fact that the cardanic part 11 in turn is pivoted in the housing 9 about the horizontal pivot axis 12, it follows that the stabilized part 22 is bi-axially pivoted in relation to the housing 9. Thus, the stabilized part 22 is allowed to turn about any axis perpendicular the optical axes of the oculars 15 and 15'. A mechanical stop comprising a cylinder 26 fastened to the housing 9 and a small rod 27 fastened to the stabilized part 22 limits the span of rotation of the stabilized part 22 to about ±6 degrees relative to the housing 9. For centered optics ("stabilization off") the stabilized part 22 is locked to the housing 9 via some mechanism which is not shown here. In this situation the optical axes of the objectives are kept parallel to the optical axes of the oculars, like shown in FIG. 1.

Design criteria for optimal image stability in the horizontal plane are the following. The central rays emerging from the mirrors 3 and 3' shall be aimed straight at the vertical pivot axis 25, and be located in the plane defined by the optical axes 29 and 29' of the objectives. The points 30 and 30' where the focal points of the objectives would be found in absence of the mirrors 4 and 4', shall both have a distance to the vertical pivot axis 25 of the magnitude $f_{obj}/M$, where $f_{obj}$ is the focal distance of the objectives and M is the magnification of the instrument.

What happens at the use of the binocular is the following. Suppose that the binocular housing 9 exhibits a sinusoidal movement of magnitude ±3 degrees in the horizontal plane due to unwanted movements, and that the cardan pivoted part is not locked to the centered position (i.e., "stabilization on"). The objectives 2 and 2' and the mirrors 3 and 3' are released from the movements of the housing via the vertical pivot axis 25, and thus stabilized in the horizontal plane. The mirrors 4 and 4' are fastened to the cardanic part 11 and must therefore follow the movements of the housing 9. Thus they are non-stabilized in the horizontal plane. The horizontally non-stabilized mirrors 4 and 4' now direct the light towards the proceeding optics in such a way that synchronous image stability (i.e. the images in the two halves of the binocular are always coinciding) is achieved for movements in the horizontal plane.

For movements in the horizontal plane, image stabilization is achieved according to the theory in U.S. Pat. No. 4,542,962 and reference is made to this patent for the understanding of the description above. The entire contents of this patent is incorporated herein by reference.

Design criteria for optimal image stability in the vertical plane are the following. The central rays emerging from the mirrors 4 and 4' shall be aimed straight back in the binocular (parallel to the optical axes of the oculars at centered optics), and thus remain perpendicular to the horizontal pivot axis 12. The focal points of the objectives, 31 and 31', shall both be located the distance $f_{obj}/M$ on the ocular side of the horizontal pivot axis 12.

What happens at the use of the binocular is the following. Suppose that the binocular housing 9, due to unwanted rattling, exhibits a sinusoidal movement of magnitude ±3 degrees in the vertical plane only. The objectives 2 and 2', the mirrors 3 and 3' as well as the mirrors 4 and 4' are all released from the vertical movements of the housing via the horizontal pivot axis 12. They are not taking part in the movement of the housing and are thus stabilized. Since the focal points 31 and 31' in the real embodiment (as opposed to the sketch in FIG. 1) must be located comparatively close to the horizontal pivot axis 12, and hence remain almost stationary relative to the same axis, a stable image may be observed through the optical elements proceeding along the light path. The operation in this case differs from that in U.S. Pat. No. 4,542,962. However, the advantages related to the stabilized objectives remain.

According to the above, synchronous image stability is achieved separately in the horizontal and vertical planes for oscillations of the housing. If the instrument is subject to arbitrary oscillations, this movement may be decomposed into partial movements in the horizontal and vertical planes. Synchronous image stability is thus achieved also for this movement.

The mirrors 4 and 4' may be manufactured slightly concave, as shown by the dotted lines in elements 4 and 4' in FIG. 1. Then they would act as field mirrors, i.e. analogous to field lenses in pure lens systems. In addition they would then compensate for image field curvature that otherwise is always a problem in systems with many positive lenses. The mirrors 4 and 4' may also exhibit an aspheric surface in order to optimize the image quality. The mirrors should be located at least 5 mm from the focal points 31 and 31' so that impurities and dust do not appear too close to the foci. The distance $f_{obj}/M$ should be slightly modified if the mirrors 4 and 4' are made concave.

The switch of magnifications may be realized by moving the image erecting lenses 5 and 5' along their optical axes. The lenses 5 and 5' may also be replaced by a zoom lens system for continuous variation of the magnification. Another alternative for the same is swapping between different sets of image erecting lenses.

Image stabilized systems should exhibit static balance about each of the pivoting axes. This is considered well known and the techniques for balancing by means of counterweights does not need to be discussed. It should be noted, however, that since the pivot axes 12 and 25 are separated, a counterweight 32 is needed on the cardanic part 11.

The techniques for stabilization of the stabilized part 22 are well known. Employment of a gyro device according to U.S. Pat. No. 5,237,450 is very suitable. The entire contents of this patent is incorporated herein by reference.

Figure 2:
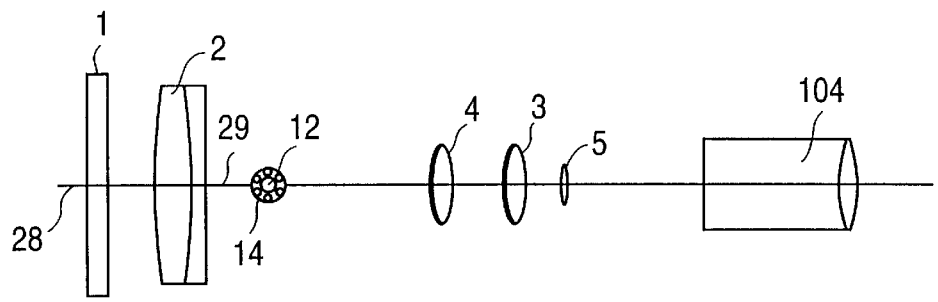
In FIG. 2, the embodiment is shown from the side with the optics in a centered position.

FIG. 2 shows the horizontally oriented embodiment of FIG. 1 from the side. According to the definition given above, the optics are centered. The parts belonging to the ocular are indicated by reference numeral 104.

Figure 3:
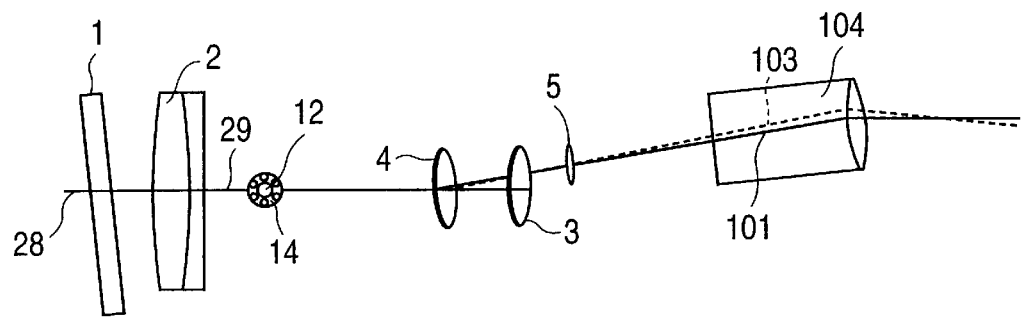
in FIG. 3 with the optics in a decentered position in a vertical plane.

FIG. 3 shows the side view of FIG. 2 in a situation of stabilization in the vertical plane. Window 1, mirror 4, image erecting lens 5 and the ocular are rotated with the housing around horizontal pivot axis 12. Objective 2 and mirror 3 are stabilized. An imaging ray with a 550 nm wavelength is drawn by full line 101. Another light ray with a 450 nm wavelength is shown by a dashed line 103. Due to the inclination between mirrors 3 and 4 and the rays being reflected at the back side of the mirrors chromatic aberration occurs. When leaving the ocular the imaging rays of different wavelengths are directed to different focal planes as can be seen from the crossing lines. Correction of this aberration will be described in detail with the further preferred embodiment of the invention.

An alternative embodiment, as a prism binocular, is described below with reference to FIGS. 4 to 8. Design criteria are given for this image stabilization. The central rays have the same definitions as above.

The prism binocular is presumed to be oriented such that the optical axis of the oculars are located in a horizontal plane. Light entering the left and right halves of the binocular passes through the windows 36 and 36' and the objectives 37 and 37', is reflected in the plane mirrors 38 and 38', passes the Barlow lenses 39 and 39', is reflected four times in the Schmidt prisms 40 and 40' and three times in the prisms 41 and 41', before it exits through the oculars 42 and 42', in which an erect image is observed.

Figure 4:
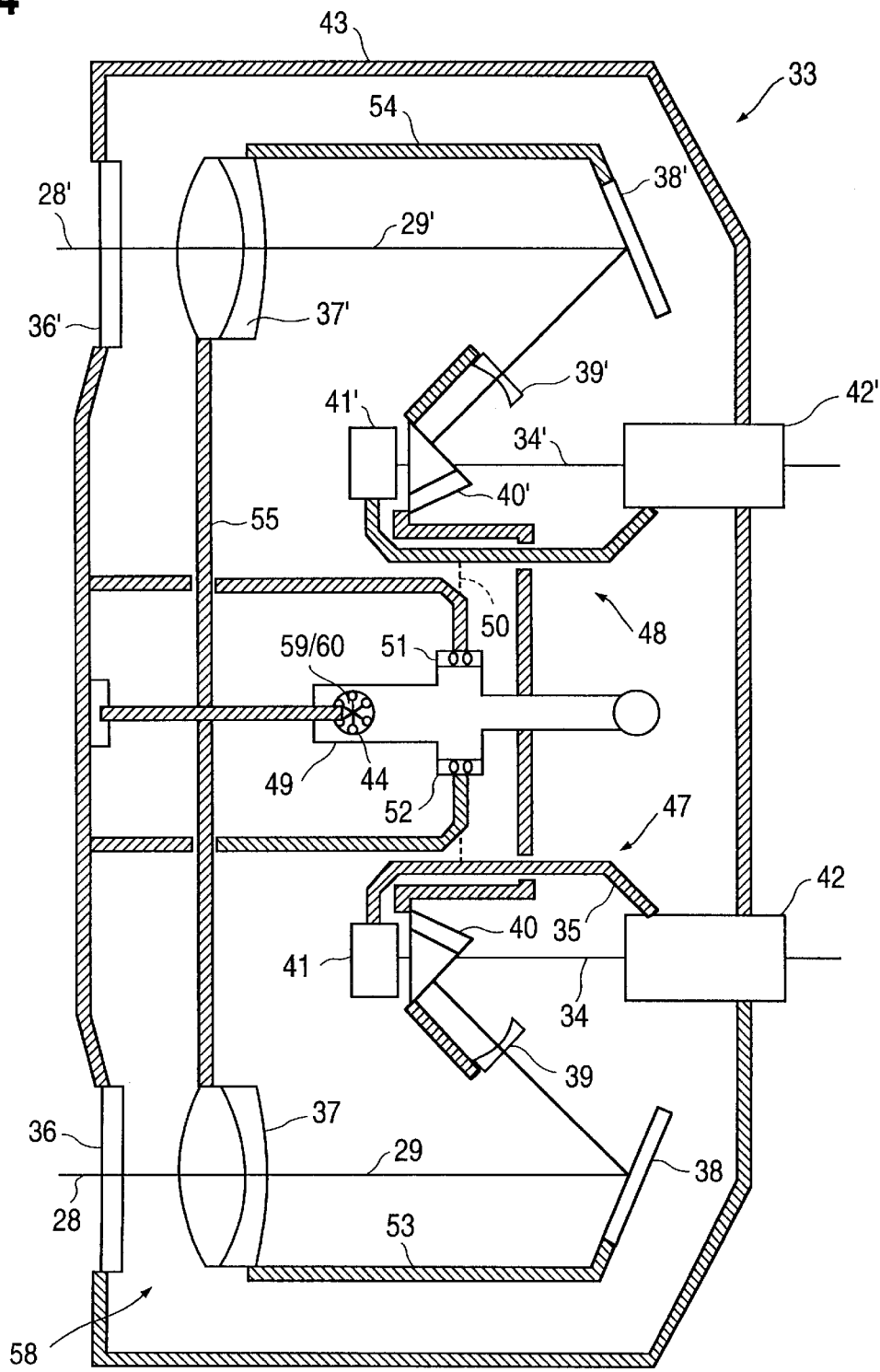
FIG. 4 shows schematically a horizontal cross-section of another preferred embodiment.

The optical effect of the windows 36 and 36', fastened to the housing 43, is negligible, in the FIG. 4 arrangement. The objectives 37 and 37' are common achromats. The mirrors 38 and 38' are surface coated for high reflectivity. The lenses 39 and 39' are common Barlow lenses. The Schmidt prisms are well known and need no detailed description here. The prisms 41 and 41' are shown in a view from the top in FIGS. 4 and 5, and in a side view in FIG. 6. The properties of these prisms are described in U.S. Pat. No. 3,475,073, where also a few modifications of the same are discussed. The entire contents of this patent is incorporated herein by reference. In brief, they can be said to act essentially as "mirrors with translation". The surfaces 45 and 46 of the prisms 41 and 41' must be coated to achieve total internal reflection.

Variation of the inter-ocular distance is performed as follows. The prism 41 is connected to its ocular 42 via a bridge 35, thus comprising a unit 47. This unit may be turned a small angle relative to the housing 43 about the central ray entering the prism 41. The ocular 42' and the prism 41' comprise a corresponding unit 48 on the right hand side of the binocular, which should be pivoted likewise. The two units 47 and 48 are counter-rotation via some synchronizing mechanism (not shown), thus maintaining the external symmetry of the binocular.

The cardanic part 49 is uni-axially pivoted in the housing 43 about an axis 50, defined by the ball bearings 51 and 52. This horizontal pivot axis 50 is perpendicular to the optical axes of the objectives and intersects these. The Barlow lenses 39 and 39' as well as the Schmidt prisms 40 and 40' are fastened to the cardanic part 49. The objectives 37 and 37' are mechanically attached to the plane mirrors 38 and 38' via bridges 53, 54 and 55, all of which comprise a stabilized unit 58. This stabilized unit 58 is pivoted in the cardanic part 49 via ball bearings 59 and 60, which define a vertical pivot axis 44. (The ball bearing 60 is not shown because it is located right below the ball bearing 59.) The pivoting of the cardanic part 49 in the housing 43 makes the stabilized part 58 bi-axially pivoted in relation to the housing 43. Thus, the stabilized part 58 is allowed to turn about any axis perpendicular to the optical axes 34 and 34' of the oculars 42 and 42', respectively. Like the embodiment in FIG. 1, the span of rotation of the stabilized part 58 is limited to about ±6 degrees in relation to the housing 43 via some mechanics (not shown). For centered optics ("stabilization off") the stabilized part 58 is locked to the housing 43 via some mechanism which is not shown here. In this situation, the optical axes of the objectives are kept parallel to the optical axes of the oculars. Thus, the pivoting mechanism is essentially the same as in the embodiment exhibited in FIG. 1.

Figure 5:
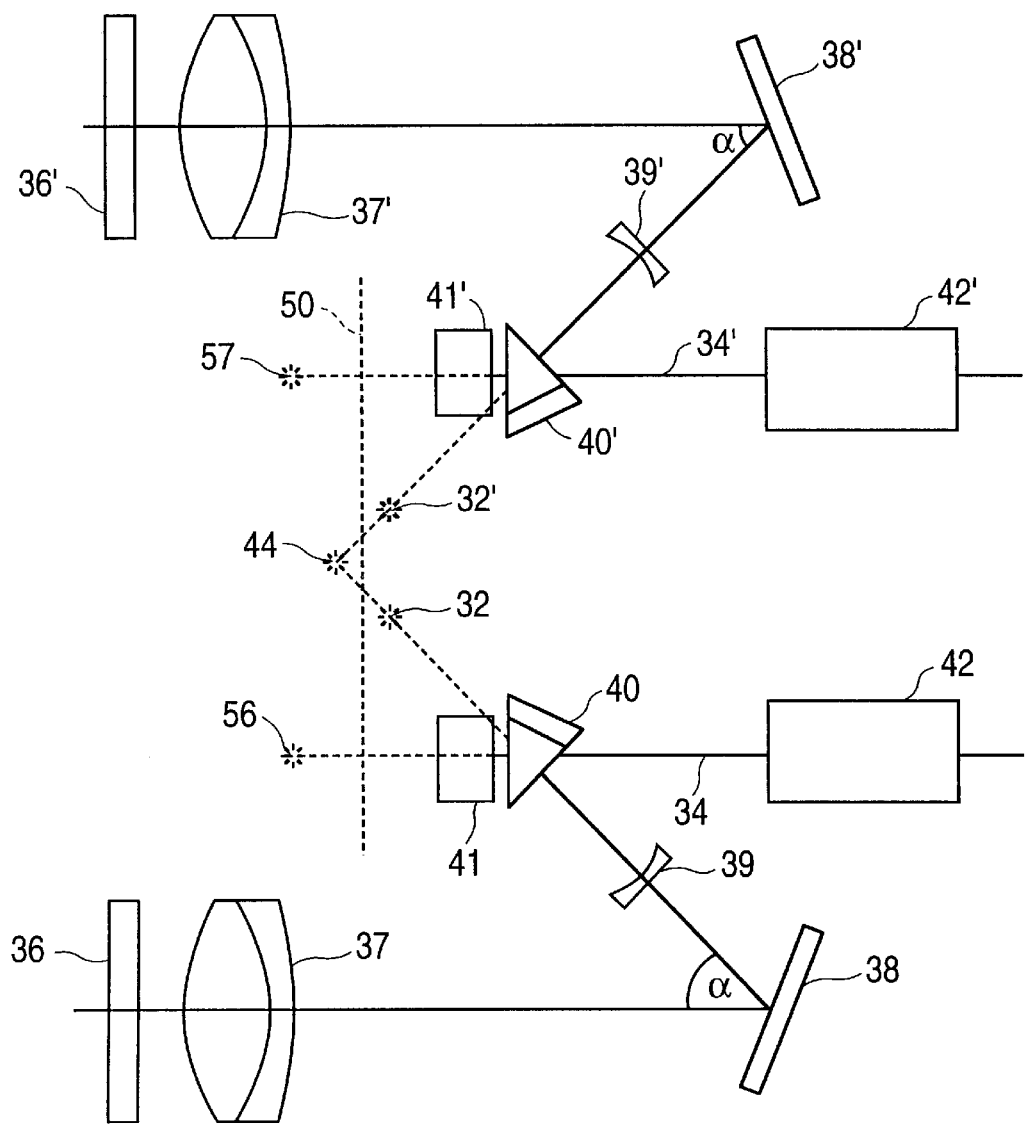
FIG. 5 shows the same cross-section but only the optical components.

Design criteria for optimal image stability in the horizontal plane are the following as illustrated in FIG. 5. The central rays emerging from the plane mirrors 38 and 38' shall be directed straight on to the vertical pivot axis 44, and be situated in the plane defined by the optical axes of the objectives. The points 32 and 32' where the focal points of the objectives would be found if the Barlow lenses, Schmidt prisms and prisms 41 and 41' were absent, shall be located the distance $f_{obj}/M$ from the vertical pivot axis 44 (measured along the central rays emerging from the plane mirrors 38 and 38'). As before $f_{obj}$ is the focal distance of the objectives 37 and 37' and M is the magnification of the instrument.

Design criteria for optimal image stability in the vertical plane are the following. The central rays emerging from the Schmidt prisms 40 and 40' shall be directed straight at and be perpendicular to the horizontal pivot axis 50. The points 56 and 57 where the focal points of the objectives would be found if prisms 41 and 41' were absent, shall be located the distance $f_{oc}$ in front of the horizontal pivot axis 50 with $f_{oc}$ being the focal distance of the ocular.

Figure 6:
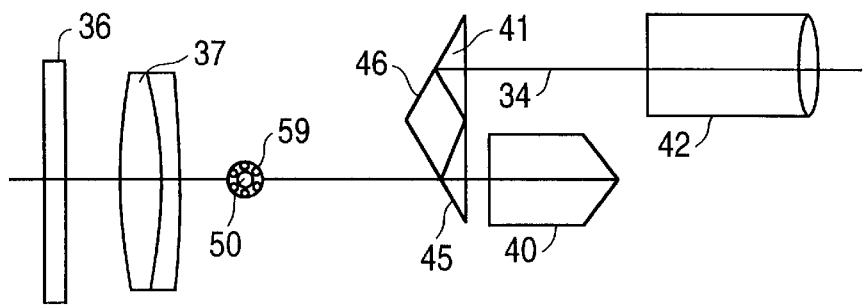
In FIGS. 6 and 7, these components are shown from the side in a centered and in a decentered position.

FIG. 6 is a partial side view of the optical components shown in FIG. 5 in the centered position. The three internal reflections in prism 41 and its translation property to the optical axis 34 of the ocular 42 are illustrated.

Figure 7:
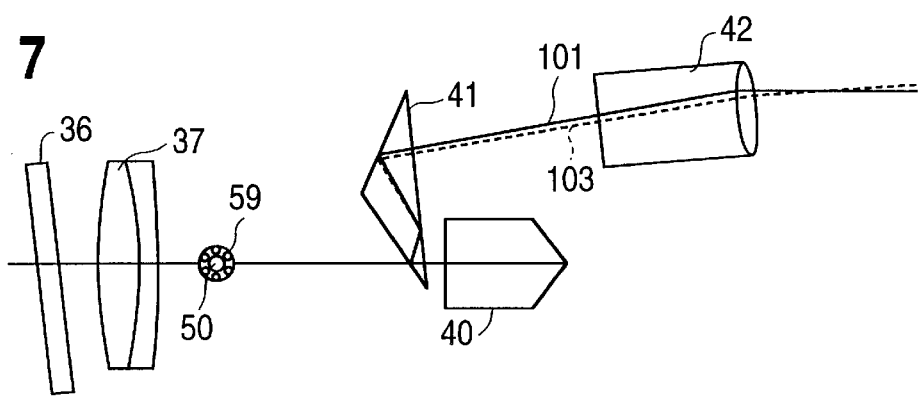

FIG. 7 is similar to FIG. 3. Stabilization in the vertical plane by rotation about pivot axis 50 results in an inclination of window 36, prism 41 and ocular 42 locked to the housing with respect to the optical axis of objective 37 and Schmidt prism 40. Due to the decentered optics again chromatic aberration results. Because of the longer optical path in the prisms the amount of aberration in the case of the prism binocular is more considerable than in the case of the first described mirror binocular. A light ray with 550 nm wavelength is passing through the system as the full line 101. Another light ray with 450 nm wavelength shown by the dashed line 103 is refracted more than the 550 nm ray as the rays pass the prism 41. When leaving the ocular 42, the rays of different wavelengths are directed to different focal planes as can be seen from the crossing lines.

Figure 8:
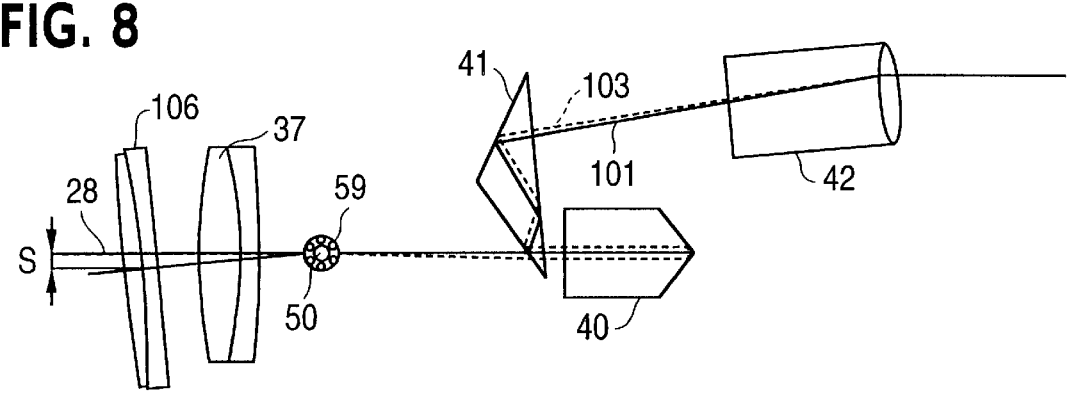
FIG. 8 shows a color-correcting front lens.

In order to reduce this effect, a color-correcting lens 106 is chosen to replace the front window 36 as shown in FIG. 8. The objective lens system now includes the parts 106 and 37. For light of 550 nm wavelength the color-correcting lens 106 has zero power (infinite focal length), while for 450 nm it has some weak positive power with a focal distance $f_2$. Now, what happens when the binocular housing with the front color-correcting lens 106 is rotated about pivot axis 50 is that the node point of the color-correcting lens 106 is translated a distance s off the optical axis 28. Since the color-correcting lens 106 has zero power for 550 nm this ray is not affected by the lens. The 450 nm light ray, on the other hand, is refracted as shown by the dashed line 103. By further passing through the prisms 40 and 41 the overall refraction is reversed in comparison to the situation in FIG. 7 and the rays leaving the ocular 42 are in parallel. These can be seen by comparing rays 101 and 103 leaving ocular 42 in FIGS. 7 and 8.

By carefully designing the color-correcting lens 106, the value of $f_2$ can be given such a value that chromatic aberration due to motions in the vertical plane can be fully compensated. It should raise no problems for the professional optician to design this lens according to actual requirements, based on the above discussion.

One may understand that also motions in the horizontal plane give raise to chromatic aberrations. However, since the Schmidt prism 40 is unstabilized in the horizontal plane, both prisms in this case contribute to the chromatic aberrations. This makes the aberration larger in the horizontal plane than in the vertical plane. Thus, for total compensation of the chromatic aberration in the horizontal plane, the color-correcting lens 106 should now have higher power (shorter focal length) for 450 nm than calculated for the vertical plane. However, this would result in overcompensation for chromatic aberration in the vertical plane. It is advisable to choose some intermediate power for the color-correcting lens, such that it somewhat overcompensates in the vertical plane and somewhat undercompensates in the horizontal plane. One realistic design study resulted in a 68% reduction of the chromatic aberration in both the horizontal and the vertical planes.

Reference is now made to FIG. 3. Here the dashed line indicating light of 450 nm wavelength leaves the ocular in a downward direction (as opposed to the situation in FIG. 7 where the corresponding line leaves the ocular in an upward direction). The reason for this is the properties of the unstabilized optics, namely mirror 4 in combination with lens 5. To compensate for the color aberration in this case the front window 1 should be replaced by a color-correcting lens that has some small negative power for the 450 nm line compared to the 550 nm line.

Naturally, in all cases the color-correcting lens may have non-zero power for the 550 nm wavelength. This alters the power for the other wavelengths accordingly.

Modifications to the embodiments of the stabilized binocular instruments described above are exemplified below. Additional modifications will occur to those skilled in the field after reading this description.

The stabilized parts, 22 and 58 respectively, need not be completely stabilized but may by means of some mechanism be made to move in a certain chosen proportion to the motion of the housing. The distances of the real and virtual focal points (30, 30', 31, 31', 32, 32', 56, 57) from the pivot axes should in this case be changed from the values $f_{obj}/M$ and $f_{oc}$ in relation to the proportion of co-motion. In addition, the proportional co-motion may even be different in the horizontal and vertical planes.

The Barlow lenses 39 and 39' may be fastened to the stabilized part 58 instead of the cardanic part 49, or they may be left out. In these cases, the distance $f_{obj}/M$ in the description above should be replaced by $f_{oc}$. Another modification is that negative entirely non-stabilized lenses may be inserted between the Schmidt prisms 40, 40' and the prisms 41, 41'. This implies that the distance $f_{oc}$ in the description above should be replaced by $f_{obj}/M$. Further, the optical axes of the oculars are not necessarily parallel to those of the objectives at centered optics. In this case the distance $f_{obj}/M$ in the description above should be replaced by $f_{oc}$. Prisms 41, 41' and oculars may be replaced by some image recording element, for example CCD-panels for video recording.

Generally, analysis should be carried out in each particular case to find the suitable proportional co-motion, position for the pivot axes, etc., when a modification is made from the basic embodiments described in connection with FIGS. 1 and 4. A skilled mechanical designer should be able to do this.

Even though only symmetric binoculars have been discussed above, the components of the two binoculars halves may be different.

Common to the embodiments described above is that the central rays emerging from the reflecting optical elements attached to the objectives are directed inward, straight at, or slightly to the side of, a vertical pivot axis. Also, that the central rays emerging from the optical elements fastened to the cardanic part are essentially perpendicular relative to an horizontal pivot axis. The angle a between incident and outgoing rays at the first optical element (shown in FIG. 5) is almost always at least 15 degrees.

The description has been focused on binoculars, however, photographic film or CCD sensors (for example for stereo cameras) may replace the oculars. CCD sensors may be placed at the points 31, 31' (FIG. 1). Then, no other optical elements are present, than those included in the stabilized part and in the cardanic part.

It is pointed out that all locations of the pivot axes are covered by the present invention. If a designer for some reason chooses a position for a pivot axis that does not give optimal image stability, then also this is included. The designer also has the option to add other stabilized or non-stabilized optical elements at any location in the light path. Such modifications may affect the positions of the pivot axis. Thus, it is especially pointed out that the invention is not limited to the particular optics or the particular locations of the pivot axes of the embodiments exemplified here.

Further, optical elements may be present in only one half of the binocular. The other may, for example, contain an IR search light. The optics described is in fact suitable also for monocular optics.

The mirrors 4 and 4' may be cast in one and the same mould, thus constituting only one reflecting component. However, in this case the incident central rays from the objectives are separated on the reflecting part, which then is thought of as two optical elements.

Any reference numerals included in the claims are provided to facilitate understanding and do not affect the intended scope of the claims.

What is claimed is:

1. An image stabilizing optical instrument, comprising:

a housing (9; 43);

a cardanic part (11; 49) connected to the housing via a suspension for rotary motion about a first pivot axis (12; 50); and an objective lens system (2; 37), a first optical element (3; 38) including a reflecting surface, and a second optical element (4; 40) including at least one reflecting surface, along a light path, wherein at least some part of the objective lens system (2; 37) and the first optical element (3; 38) are fastened together to constitute a unit (22; 58) that is connected to the cardanic part (11; 49) via suspension for rotary motion about a second pivot axis (25; 44), the second optical element (4; 40) being fastened to the cardanic part (11; 49);

the objective lens system having an unstabilized part (106) and a stabilized part, wherein the unstabilized part (106) has a difference in focal length between two wavelengths to at least partly compensate for chromatic aberration caused by refraction in the instrument when said stabilized part of the instrument is decentered.

2. An instrument according to claim 1, comprising:

two objective lens systems each having an unstabilized part (106, 106') and a stabilized part (2, 2'; 37, 37');

two realizations of the first optical element (3, 3'; 38, 38'), each realization having at least one reflecting surface; and two realizations of the second optical element (4, 4'; 40, 40'), each realization having at least one reflecting surface;

wherein at least part of the objective lens systems (2, 2'; 37, 37') and the two first optical elements (3, 3'; 38, 38') are connected together to comprise said unit (22; 58), which is connected to the cardanic part via a suspension for rotary motion about said second pivot axis (25; 44), both second optical elements (4, 4'; 40, 40') are fastened to the cardanic part, and the unstabilized part of the objective lens system (106, 106') is fastened to the housing.

3. An instrument according to claim 2, wherein incident and exit central rays of each of the two first optical elements differ by an angle of at least 15 degrees.

4. An instrument according to claim 3, wherein both exit central rays from the two first optical elements are aimed at one and the same point.

5. An instrument according to claim 2, wherein each one of the two first optical elements is a mirror, and each one of the two second optical elements is a mirror.

6. An instrument according to claim 5, further comprising a positive lens (5, 5') following each one of the two second optical elements.

7. An instrument according to claim 6, wherein the reflective surface of each one of the second optical elements is concave.

8. An instrument according to claim 2, wherein each one of the two first optical elements is a mirror (38, 38') and each one of the two second optical elements is a Schmidt prism (40, 40').

9. An instrument according to claim 8, wherein each of the two Schmidt prisms is followed, as seen along the light path, by a prism (41, 41').

10. An instrument according to claim 1, further comprising a uni-axially suspended unit (10) having two parallel reflecting surfaces and an ocular.

* * * * *